United States Patent [19]
Reese

[11] Patent Number: 5,619,561
[45] Date of Patent: Apr. 8, 1997

[54] CALL-WAITING AND CALLER IDENTIFICATION WITH THREE-WAY CONVERSATIONS ARRANGEMENTS

[76] Inventor: Morris Reese, P.O. Box 6651, Thousand Oaks, Calif. 91359

[21] Appl. No.: 493,563

[22] Filed: Jun. 22, 1995

[51] Int. Cl.⁶ .................................................. H04M 1/57
[52] U.S. Cl. ..................... 379/142; 379/215; 379/202; 379/205
[58] Field of Search ................................. 379/201, 215, 379/202, 203, 204, 205, 206, 142; 370/62

[56] References Cited

U.S. PATENT DOCUMENTS

| | | | |
|---|---|---|---|
| 3,626,107 | 12/1971 | Armstrong | 379/215 |
| 3,997,731 | 12/1976 | Wilmot et al. | 379/215 |
| 4,232,199 | 11/1980 | Boatwright et al. | 379/205 |
| 4,445,211 | 4/1984 | Weber | 379/201 |
| 4,445,212 | 4/1984 | Weber | 379/201 |
| 4,446,553 | 5/1984 | Weber | 379/201 |
| 4,446,554 | 5/1984 | Weber | 379/201 |
| 5,263,084 | 11/1993 | Chapuk et al. | 379/215 |
| 5,404,396 | 4/1995 | Brennan | 379/204 |

FOREIGN PATENT DOCUMENTS

328775A   12/1991   Japan ............................. 379/203

*Primary Examiner*—Ahmad F. Matar
*Attorney, Agent, or Firm*—Fay, Sharpe, Beall, Fagan, Minnich & McKee

[57] ABSTRACT

An enhanced telephony call-waiting with caller identification and three-way conversations feature is provided wherein identifying information related to a third party wishing to converse with a first party already engaged in a conversation with a second party is provided to the first party and then, in response to the first party entering a predetermined digit on its apparatus based on the third party identity, the third party is connected to the first and second parties for three-way conversations between the first, second and third parties.

2 Claims, 4 Drawing Sheets

CALL-WAITING AND CALLER IDENTIFICATION WITH THREE-WAY CONVERSATIONS ARRANGEMENTS

FIELD OF THE INVENTION

The invention relates generally to telephone subscriber services and more particularly to call-waiting and caller identification that includes three-way conversations between telephone subscribers.

BACKGROUND OF THE INVENTION

Call-waiting service is commercially available in many parts of the country. The call-waiting service provides an audible tone signal to a subscriber while his telephone is in use, letting him know that another caller is trying to reach his station. The service enables the subscriber to switch alternately between the party he was initially connected to and the new caller, simply by depressing his hookswitch momentarily. The party he is not talking with at any moment is placed on hold. If the first party disconnects, the next caller appears in his place and the operation may be repeated.

Three-way calling service is also commercially available in many parts of the country and it enables a subscriber to establish a three-way conference call. As discussed in U.S. Pat. No. 3,626,107 to Loren K. Armstrong and George R. Bergquist, the subscriber interrupts a call in progress at his station by momentarily depressing his hookswitch. The party at the other end of the line is automatically placed on hold and the subsciber is given a dial tone. The subscriber then dials the desired third party. Once he has dialed the third party's number, he may set up the conference call at any time, either immediately, or after he has spoken privately with the third party, by another flash of his hookswitch. A third flash of his hookswitch disconnects the third party. Three-way calling is under control of the subscriber, and during times when it is in use, call-waiting service is inhibited. Similarly, when call-waiting service is in use, three-way calling service is inhibited.

A recent version of caller identification with call-waiting is discussed in U.S. Pat. No. 5,263,084 to Chaput et al. which is directed to providing third party identification to a called party's telephone set while the latter is off-hook. From another perspective, the invention provides a method of transmitting caller identification information of a calling third party between a central office and a called customer premises equipment having receiving and transmitting transducers while the called customer premises equipment is presenting an off-hook condition to the called customer loop, comprising the steps of sending an alerting tone signal having predetermined characteristics from the central office to the called customer premises equipment to alert the latter that the central office wishes to send caller identification information relating to the calling third party. In response to the alerting tone signal, the called customer premises equipment mutes its associated handset for a predetermined duration of time corresponding to at least the duration of the calling third party identification information to be transmitted between the central office and the caller customer premises equipment. The called customer premises equipment receives and displays to the called customer during a silent interval of the alerting tone signal the identification information of the calling third party, thereby allowing the called customer to either accept or reject the call from the third party in the conventional manner but also based on the displayed identification information. While this architecture implements a useful version of caller identification with call-waiting, it does not teach call-waiting with or without caller identification that includes three-way conversations between a calling third party, a called first party, and a second party who is already engaged in a conversation with the first party.

Therefore, it is an object of this invention to provide an enhanced form of call-waiting with or without caller identification that includes three-way conversations between telephone customers.

It is another object of this invention to provide a method of providing identification information related to a calling third party to a called first party already engaged in a conversation with a second party via a terminating central office and then, in response to a predetermined digit entered on the first party apparatus keypad, connecting the calling third party to the first and second parties for three-way conversations between the first, second and third parties.

It is still another object of this invention to provide a method of connecting a second party who is on hold to a first party who placed the second party on hold and a third party whose incoming call has been answered by the first party for three-way conversations between the first, second and third parties, in response to a predetermined digit entered on the first party apparatus keypad.

SUMMARY OF THE INVENTION

In accordance with the invention, there is provided to a first party already engaged in a conversation with a second party via a telephone or a cellular company terminating central office (TCO) a directory telephone number with a corresponding name (hereinafter sometimes referred to as "DN") of a calling third party wishing to converse with the first party. The TCO initiates the procedure by sending a call-waiting (CW) tone signal to the first party and audible ringback signals to the calling third party, in response to the receipt of the flagged "public" DN of the calling third party from a telephone or a cellular company originating central office indicating that the calling party DN is to be disclosed to the first party. The first party apparatus responds to the detection of the CW tone signal from the TCO by muting or deactivating its associated handset (e.g. microphone and earphone) for a predetermined duration of time corresponding to at least the duration of the calling third party DN to be transmitted between the TCO and the first party apparatus. The first party apparatus responds to the detection of the CW tone signal from the TCO also by generating and then transmitting to the TCO an acknowledgement tone signal to inform the TCO that it is an apparatus capable of receiving frequency shift keying (FSK) data representative of the DN of the calling third party. The TCO responds to the acknowledgement tone signal by transmitting the FSK data representative of the DN of the calling party to the first party apparatus during a silent interval of the CW tone signal cycle and thus allows the first party, based on the identity of the calling third party, to either (1) accept or reject the call from the third party in a manner conventional for the CW process, (2) enter a predetermined digit on its apparatus keypad during the initial or reminder CW tone signal cycle while engaged in the conversation with the second party to indicate to the TCO that the calling third party is to be connected to the first and second parties for three-way conversations between the first, second and third parties, or (3) accept the call from the third party in a manner conventional for the CW process while the second party is placed on hold and then, after speaking privately with the third party, enter a predetermined digit on its apparatus keypad to indicate to the TCO that the second party is to be connected to the first and third parties for three-way conversations between the first, second and third parties. As an option, the first party may depress the hookswitch (e.g. twice) on his apparatus, rather than enter a predetermined digit, to indicate to the TCO a three-way conversations request.

In the preferred embodiment of the invention, the predetermined digit transmitted to the TCO is a dual-tone multifrequency (DTMF) signal since it is not easily duplicated by random events or voice signals, the CW tone signal transmitted from the TCO and the acknowledgement tone signal transmitted from the first party apparatus are multi-frequency dual-tones, and the FSK data representative of the calling third party DN from the TCO is formatted in accordance with the existing and well-known Bellcore standards TR-TSY-000030 and TR-TSY-000031.

BRIEF DESCRIPTION OF THE DRAWINGS

A more complete understanding of the invention may be obtained from the following description and the accompanying drawings in which.

DESCRIPTION OF THE PREFERRED EMBODIMENT(S)

Figure 1A:
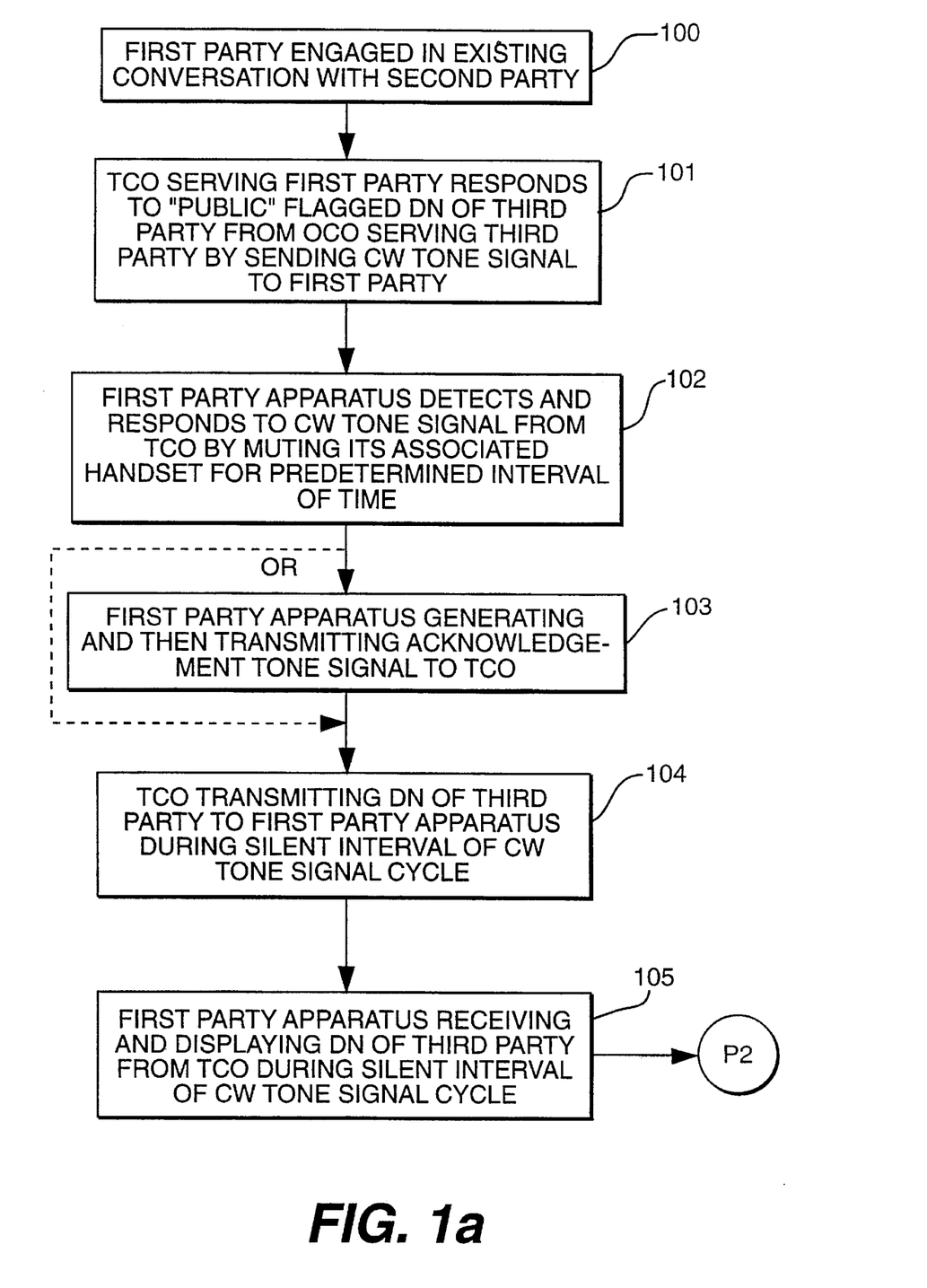
FIG. 1a and FIG. 1b shows, in flow chart form, the sequence of operations of the method of the invention.
Figure 1B:
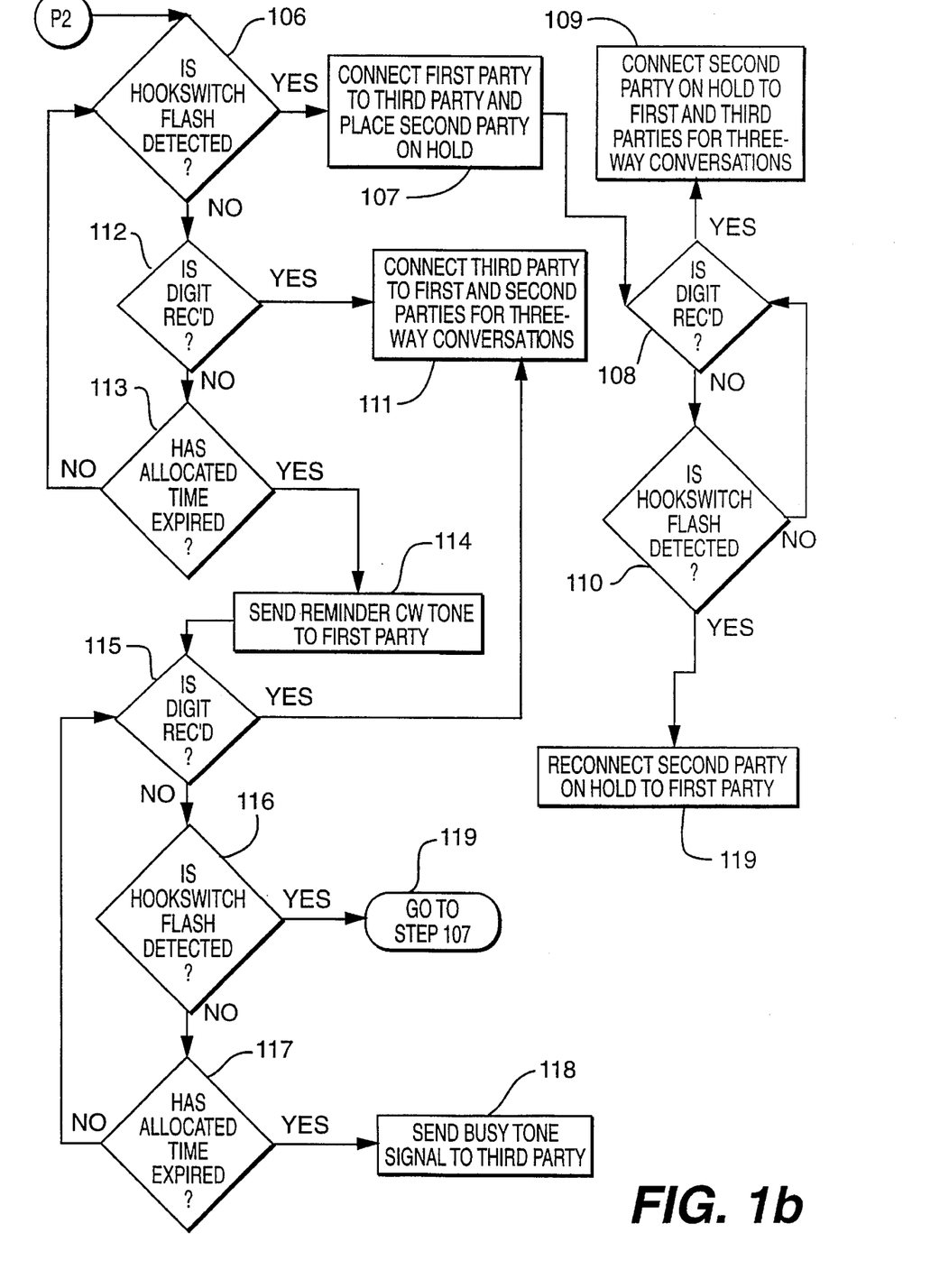

Referring now to FIG. 1a and FIG. 1b, (step 100) the process begins when a third party calls a first party already engaged in a conversation with a second party. At step 101, a telephone company terminating stored program-controlled switching office (hereinafter sometimes referred to as "TCO") serving the first party responds to a flagged "public" directory telephone number with a corresponding name (hereinafter sometimes referred to as "DN" or "identification information") of the third party from a telephone company originating stored program-controlled switching office (hereinafter sometimes referred to as "OCO") serving the third party by entering an off-hook call-waiting procedure which causes a multi-frequency tone signal (hereinafter sometimes referred to as "CW tone signal") to be sent to the first party.

At step 102, the first party apparatus (hereinafter sometimes referred to as "telephone set" or "stand-alone device" connected to the telephone set) comprises a dual-tone detector circuit which is suitable for detecting the CW tone signal from the TCO in the presence of voice signals on the first party loop and signals a microprocessor of the apparatus which reacts by muting or deactivating the handset (i.e. the microphone and earphone) of the apparatus for a predetermined duration of time corresponding to at least the duration of the third party DN to be transmitted between the TCO and the first party apparatus.

At step 103, a dual-tone multifrequency (DTMF) generator of the apparatus reacts to signaling from the microprocessor by generating and then transmitting to the TCO an acknowledgement tone signal to indicate to the TCO that it is an apparatus capable of receiving frequency shift keying (FSK) data representative of the third party DN. The acknowledgement tone signal is transmitted to the TCO in a very quiet period on the first party loop since both the first and second parties voice paths have been muted, the first party by its own apparatus and the second party by the TCO in the manner conventional for a call-waiting process. Optionally, without the use of the acknowledgement tone signal, the TCO may be modified to automatically transmit the third party DN to the first party apparatus immediatedly following the transmission of the initial CW tone signal to the first party.

At step 104, in response to the acknowledgement tone signal from the DTMF generator of the first party apparatus, central control of the TCO sends an order over a bus system of the TCO to a distributor of the TCO which signals a data transmitter of the TCO which reacts by transmitting the third party DN from a call store of the TCO to the first party apparatus during a silent interval of the initial CW tone signal cycle using well-known FSK signaling.

At step 105, the first party apparatus comprises a frequency shift keyed (FSK) demodulator which receives the ensuing FSK data representative of the third party DN from the data transmitter of the TCO during the silent interval of the initial CW tone signal cycle and translates it to a digital stream that is fed to the microprocessor of the first party apparatus which translates the data into the DN of the third party which is displayed in a display unit on the first party apparatus. The first party is then in a position to (1) accept or reject the call from the third party in a manner conventional for the call-waiting process, (2) enter a predetermined digit on his apparatus keypad while engaged in the existing ongoing conversation with the second party to dicate to the TCO that the third party is to be connected to the first and second parties for three-way conversations between the first, second and third parties, or (3) accept the call from the third party while the second party is placed on hold in a manner conventional for the call-waiting process and then, while privately speaking to the third party, enter a predetermined digit on his apparatus keypad to indicate to the TCO that the first party is to be connected to the first and third parties for three-way conversations between the first, second and third parties. To avoid ambiguity in operation of the invention, the call-waiting process is inhibited when the three-way conversations feature of the invention is in progress.

At step 106, central control of the TCO determines whether various scanners of the TCO have detected a hookswitch flash on the first party loop due to the first party depressing the hook-switch on his apparatus to answer the call from the third party. If a hookswitch flash is detected, (step 107) prior art, central control connects the first party to the third party for a conversation while the second party is placed on hold in the manner conventional for the call-waiting process.

At step 108, central control of the TCO determines whether the keying of a predetermined digit on the first party apparatus keypad has been received by a digit receiver of the TCO. Assuming that a predetermined digit has been received and that the digit is a permitted digit, (step 109) central control reads the digit and, as determined by information stored in a translation table (not shown) in the central control of the TCO, reconnects the second party presently on hold to the first and third parties for three-way conversations between the first, second and third parties. Alternately, if it is determined that a predetermined digit has not been received by the digit receiver, or that the received digit is not a permitted digit, (step 110) central control of the TCO makes another decision to determine whether various scanners of the TCO have detected a hookswitch flash on the first party loop due to the first party terminating its connection to the third party by depressing the hookswitch on his apparatus. If a hookswitch is detected, (step 119) central control executes a program in a program store of the TCO which reconnects the first party to the second party on hold in the manner conventional for the call-waiting process. In the alternate, if a hookswitch flash is not detected, (steps 108 and 109) are the same as previously described.

Referring now back to step 106, if it is determined that a hookswitch has not been detected, (step 112) another decision is made by central control of the TCO to determine whether the keying of a predetermined digit on the first party apparatus keypad has been received by the digit receiver of the TCO. Assuming that a predetermined digit has been received and that the digit is a permitted digit, (step 111) central control reads the digit and, as determined by information stored in a translation table (not shown) in the central control of the TCO, connects the third party to the first and second parties for three-way conversations between the first, second and third parties. Assuming that the digit is not received, or that the digit received is not a permitted digit, (step 113) still another decision is made by central control to determine whether the very quiet period of time allocated after the initial CW tone signal has expired. If the allocated period of time has not expired, (steps 106, 107, 108, 109, 110 and 119 or steps 106, 112 and 111) processing is the same as previously described. However, if the allocated period of time has expired, (step 114) central control executes a program in program store of the TCO which generates and then sends a reminder CW tone signal to the first party indicating that the third party is still waiting to converse with the first party.

At step 115, a decision is made by central control to determine whether the keying of a predetermined digit on the first party apparatus keypad, in response to the reminder CW tone signal, has been received by the digit receiver of the TCO. If a predetermined digit is received and the digit is a permitted digit, (step 111) the process is the same as previously described. Alternately, if a predetermined digit has not been received by the digit receiver, or that the digit received is not a permitted digit, (step 116) central control of the TCO determines whether various scanners of of the TCO have detected a hookswitch flash on the first party loop due to the first party depressing the hookswitch on his apparatus to answer the still waiting call from the third party. If it is determined that a hookswitch has indeed, been detected, (step 107 via step 119) the process is the same as previously described. However, if it is determined that a hookswitch has not been detected, (step 117) still another decision is made by central control to determine whether the very quiet period of time allocated after the reminder CW tone signal has expired. If the allocated period of time has not expired, (steps 115 and 111, or steps 115, 116 and step 107 via step 119) are the same as previously described. In the alternate, if it is determined that the allocated period of time has expired, (step 118) central contral executes a program in program store of the TCO which causes a busy tone to be sent to the third party.

In accordance with the invention, the predetermined digit entered on the first party apparatus keypad to actuate three-way conversations between the first, second and third parties may be any standard DTMF (0–9, #, *) tones. Also in accordance with the invention, the first party may actuate three-way conversations between the first, second and third parties by twice depressing the hookswitch on his apparatus rather than entering the predetermined digit on his apparatus keypad.

Figure 2:
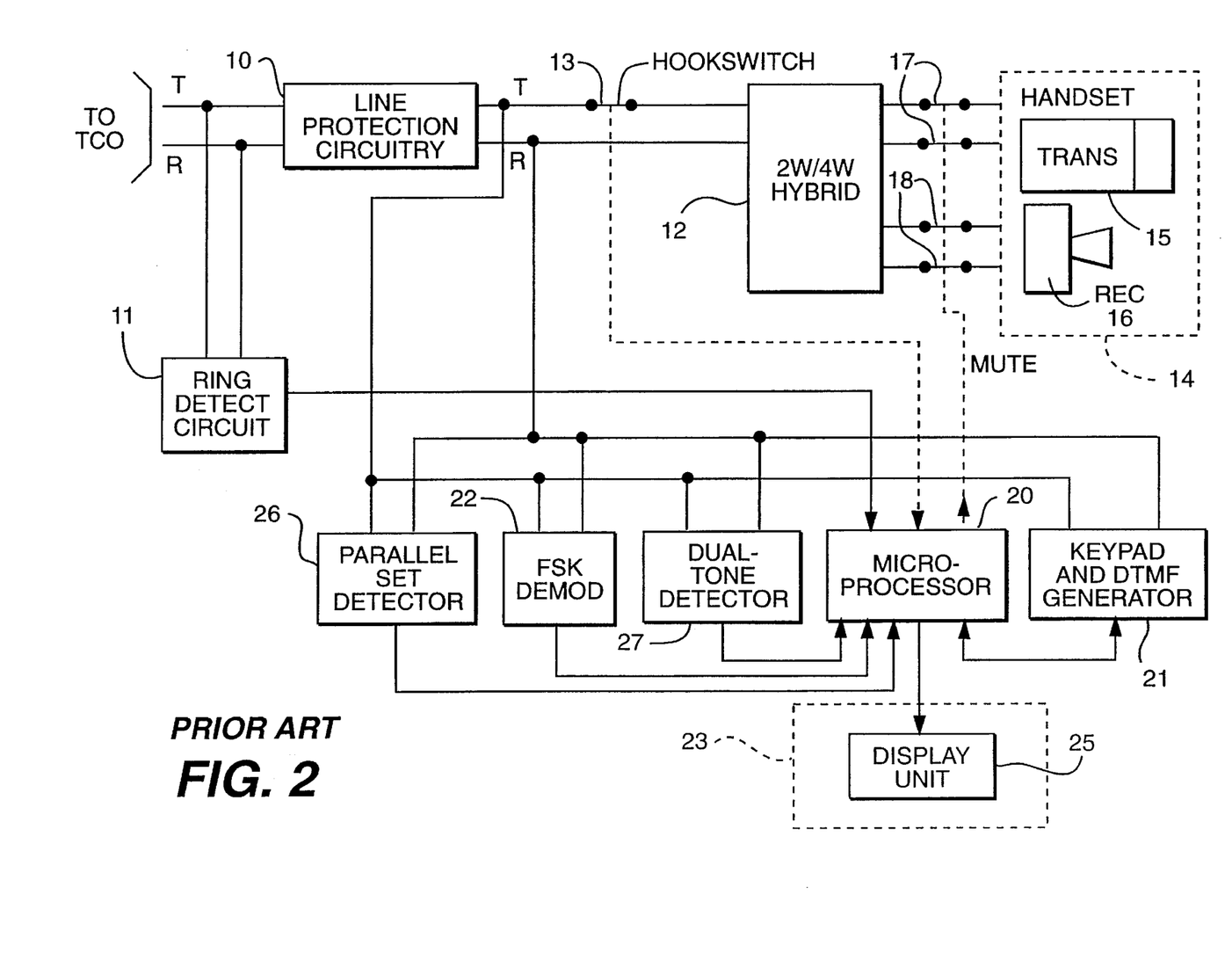
FIG. 2, prior art, is a block diagram schematic diagram of an apparatus (telephone set or stand-alone device connected to the telephone set) connected via tip and ring leads to a terminating stored program-controlled switching office shown in FIG. 3.
Figure 3:
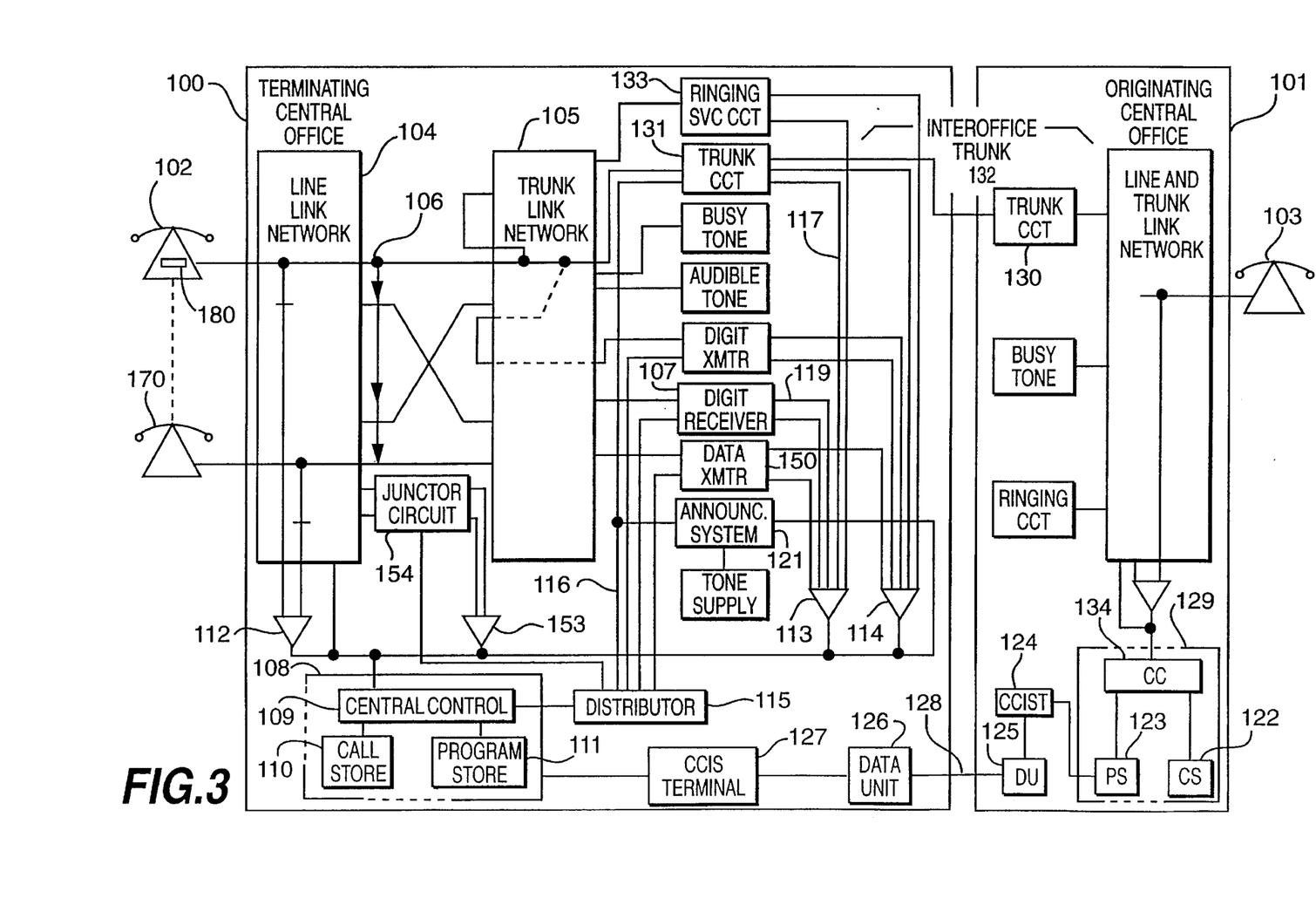
FIG. 3 shows, in block diagram form, a telephone system having an originating stored program-controlled switching office and a terminating stored program-controlled switching office interconnected by trunks and a common channel interoffice signaling system.

FIG. 2 is a block diagram of the first party apparatus shown in FIG. 3 at station 102 represents, prior art, FIG. 1 in Chaput et al. (U.S. Pat. No. 5,263,084) and is for use with the invention. The tip and ring leads of the first party loop extend from the first party apparatus shown in FIG. 2 to the TCO shown in FIG. 3.

The first party apparatus comprises line protection circuitry 10 connected to a ring detect circuit 11 that may provide visual and/or audible alerting signals to the first party that a call has arrived. The line protection circuitry is also connected to a 2 wire/4 wire hybrid circuit 12 via a hookswitch 13. The hybrid circuit 12 is also connected to a handset 14 comprising transmit and receive transducers 15 and 16 respectively. In this case, the hybrid circuit 12 is connected to the transducers 15 and 16 via respective switches 17 and 18 as will be discussed below.

The first party apparatus also comprises a control circuit which may conveniently be a microprocessor 20 such as a Signetics type PCD-3348, a conventional keypad and dual-tone multifrequency (DTMF) generator 21, and a frequency shift keying (FSK) demodulator circuit 22 which may be an off-the-shelf unit such as model QM2211 manufactured by The Exar Corporation. The microprocessor 20 is also connected to a display 23 and visual display unit 25. These are available as off-the-shelf components.

Also connected to the microprocessor 20 and the tip and ring leads are a parallel set detector circuit 26 and a dual-tone detector circuit 27. The parallel set detector circuit 26 functions to provide an output signal that indicates whether or not the first party apparatus of FIG. 2 is connected with an off-hook extension telephone set.

The dual-tone detector circuit 27 is suitable to detect the presence of a multi-frequency dual-tone from the TCO shown in FIG. 3 in the presence of voice signals on the first party loop.

The microprocessor 20 functions as a control hub of the first party apparatus by responding to signals from the ring detect circuit 11, the circuits 22, 26, 27 and hookswitch 13 to provide control signals to the muting switches 17 and 18, the DTMF generator 21 and the display 23.

It is assumed that the first party associated with the apparatus of FIG. 2 is conversing with a second party via the TCO shown in FIG. 3 and that a third party is attempting to reach the first party.

On receiving a flagged "public" DN of the third party shown in FIG. 3 at station 103 from the OCO shown in FIG. 3, the TCO shown in FIG. 3 responds by entering a call processing software program associated with the conventional call-waiting procedure and it causes the TCO to transmit a predetermined multi-frequency dual-tone signal (CW tone). An initial suggestion is to use 250 ms of DTMF "A" for the CW tone signal having a predetermined duration. A conventional CW tone signal may be used but may be less detectable in the presence of voice signals.

At this point, the dual-tone detector circuit 27 detects the presence of the CW tone signal from the TCO shown in FIG. 3 and signals the microprocessor 20 which reacts by muting the handset 14 (i.e. the microphone and earphone) via switches 17 and 18 for a predetermined interval of time and entering a control loop that entails determining the status of any extension telephone set and signaling the DTMF generator 21 to generate an acknowledgement tone signal on the first party loop to inform the TCO that it is an apparaus capable of receiving frequency shift keying (FSK) data representative of the third party DN, as described, for example, in Chaput et al. (U.S. Pat. No. 5,263,084). Without this acknowledgement tone signal, the TCO may be modified to transmit the third party DN immediately after the CW tone signal has been transmitted. In the case that an extension telephone set is off-hook, the microprocessor 20 will prevent the acknowledgement tone signal from being transmitted by not causing it to be generated. The acknowledgement tone signal is transmitted during a very quiet period on the first party loop since both the first and second parties speech paths have been muted, the first party by its own apparatus and the second party by the TCO in the manner conventional for the call-waiting process, as described, for example, in Chaput et al. (U.S. Pat. No. 5,263,084). Almost any tone could therefore be used but it is preferable to use the DTMF "A" through "D" tones. The tone length could range from 50 to 100 ms. The tone should be sent at the same level as standard DTMF (0–9, #, *) tones since they are not easily duplicated by random events or voice signals.

At this point, the TCO shown in FIG. 3 responds to the acknowledgement tone signal from the DTMF generator 21 by transmitting FSK data corresponding to the DN of the third party to the first party apparatus during the very quiet period on the first party loop, as described, for example, in Chaput et al. (U.S. Pat. No. 5,263,084). FSK similar to that outlined in Bellcore Technical References TR-TSY-000030 and TR-TSY-000031 is suggested for the signaling method (data transmission) between the TCO and the first party apparatus.

At this point, the FSK data corresponding to the DN of the third party is received by the FSK demodulator circuit 22 which translates it to a digital stream that is fed to the microprocessor 20 which, in turn, translates the data into the DN of the third party displayed on the visual display 23. The first party is then in a position to (1) decide whether or not to accept the call from the third party based on the identity of the third party displayed on the visual display 23 without having to blindly interrupt his existing ongoing conversation with the second party, (2) indicate to the TCO based on the identity of the third party displayed on the visual display 23 without having to blindly interrupt his existing ongoing conversation with the second party that the third party is to be connected to the first and second parties for three-way conversations between the first, second and third parties, or (3) accept the call based on the identity of the third party displayed on the visual display 23 and then, after speaking privately with the third party, indicate to the TCO without having to interrupt his existing ongoing conversation with the third party that the second party who is presently on hold is to be connected to the first and third parties for three-way conversations between the first, second and third parties.

FIG. 3 shows a block diagram of a switching network comprising TCO 100 and OCO 101 which serve a plurality of telephone stations such as 102, 103 and 170.

By way of example, each of the telephone central offices is suitably an electronic program-controlled switching system of the type disclosed in U.S. Pat. No. 3,570,008 to R. W. Downing et al. of Mar. 9, 1971, and also disclosed in "The Bell System Technical Journal", Volume 43, No. 5, Parts 1 and 2, September, 1964. These citations may be referred to for a more comprehensive understanding of the construction and operation of the switching system, but a brief description will be given herein to illustrate how the invention functions within a switching system.

TCO 100 comprises line link network 104, trunk link network 105, and a stored program-controlled processor 108. Line link network 104 provides the terminations for telephone stations such as 102 and 170, while trunk link network 105 provides the terminations for trunks such as interoffice 132 which is terminated at TCO 100 via trunk circuit 131. The trunk link network also provides terminations for miscellaneous other circuits such as digit receiver 107, announcement system 121, etc. The line and trunk link networks are connected via wire junctors 106 to permit the interconnections of lines, trunks, and service circuits for call processing under the control of processor 108. Line link network 104 is also interconnected by junctor circuit 154 to complete and supervise intraoffice calls between telephone stations 102 and 170.

The majority of the logic, control, storage, supervisory, and translation functions required for the operation of this system are performed by central processor 108. A typical central processor suitable for use in the illustrative switching system is described in "The Bell System Technical Journal", Volume 56, No. 2, February, 1977. Processor 108 is a data processing facility and can be functionally divided into central control 109, call store 110, and program store 111 plus maintenance apparatus which has not been shown to simplify the drawing.

Call store 110 is a memory for storing translation and routing information in addition to temporary information relating to calls in progress and special services. This temporary information includes the busy/idle (off-hook/on-hook) status of telephone stations and circuits, calling/called station directory numbers, special service indicators, etc.

Program store 111 is a memory for storing the program instructions which direct the central control 109 to sequentially perform its many functions.

Central control 109 is the information processing unit of the system and executes the program instructions listed in program store 111 using information temporarily stored in call store 110.

Processor 108 interfaces with lines, trunks, and service circuits via scanners 112–114 and 153 and distributor 115. Distributor 115 responds to an order over a bus system from the central control 109 to apply pulses to distribution points connected to peripheral units of equipment. For example, in response to an appropriate order, distributor 115 signals over conductor 116 to actuate data transmitter 150, apparatus such as a relay in trunk circuit 131, etc.

Scanners 112–114 and 153 are used to gather information for the central control 109 by monitoring leads connected to the various peripheral units and telephone stations such as 102 and 170. Thus, when a trunk circuit such as 131 changes state as a result of a seizure from a distant originating central office, a signal is transmitted via conductor 117 to scanner 113. Similarly, scanner 113 recognizes changes of state in digit receiver 107 via conductor 119 in order to ascertain digits received from lines or trunks. Likewise, scanners 112 and 153 are used to recognize the busy/idle (off-hook/on-hook) condition of telephone stations 102 and 170. Periodically, the scanners are addressed by central control 109 over a bus system to determine the state of the peripheral units and telephone stations.

OCO 101 basically comprises the same units of equipment as TCO 100 and need not be described herein.

TCO 100 and OCO 101 are connected together and to other central offices via a common channel interoffice signaling (CCIS) system comprising terminals 124 and 127, data units 125 and 126, and data link 128. The signaling system provides high speed data transmission facilities between the central processors (108 and 129 respectively) of TCO 100 and OCO 101 to carry all signaling, address, and network control information independently of the interoffice 132 talking paths. For instance, this information includes the identity of trunks used by the telephone customers as well as calling and called party identification information. A typical example of a common channel interoffice signaling system which can be used in the present embodiment is disclosed in "The Bell System Technical Journal", Volume 57, No. 2, February, 1978.

To illustrate the present embodiment from a network perspective, call store 110 of the TCO 100 receives and temporary stores a flagged "public" DN of a calling third party from call store 122 of the OCO 101 during call setup. Central control 109 of the TCO responds to the flagged "public" DN, as determined by the information stored in a translation table (not shown) in the call store 110, by executing a call processing software program in program store 111 of the TCO associated with the off-hook call-waiting procedure of the invention and it causes a multi-frequency tone signal (e.g. CW tone of 200–250 ms of DTMF "A") to be transmitted to the first party at station 102 via trunk link network 105 and line link network 104.

Referring now back to FIG. 2 and in conjunction with FIG. 3, as previously described, dual-tone detector 27 of the first party apparatus at station 102 detects the presence of the CW tone signal from the TCO 100 and signals microprocessor 20 of the apparatus which reacts by muting the handset 14 (i.e. the microphone and earphone) via switches 17 and 18 and then entering a control loop that entails determining the status of any extension telephone set and signaling DTMF generator 21 of the apparatus to generate an acknowledgement tone signal on the first party loop to inform the TCO 100 that it is an apparatus capable of receiving FSK data representative of the DN of the calling third party. The acknowledgement tone signal is transmitted in a very quiet period on the first party loop since both the first and second parties speech paths have been muted, the first party by its own apparatus and the second party by the TCO 100 in the manner conventional for the call-waiting process. Almost any tone signal could therefore be used but it is preferable to use one of the DTMF "A" through "D" tones since they are not easily duplicated by random events or voice signals. The tone should be sent at the same level as standard DTMF (0–9, #, *) tones. Central control 109 of the TCO 100 responds to the detection of the acknowledgement tone signal, as determined by the information stored in a translation table (not shown) in call store 110 of the TCO 100, by executing a program in program store 111 of the TCO 100 and it causes an order to be sent to distributor 115 of the TCO 100 which signals data transmitter 150 of the TCO 100 via conductor 116 which, in turn, reacts by transmitting FSK data corresponding to the DN of the calling third party from call store 110 of the TCO to the first party apparatus at station 102 during the very quiet period on the first loop. The signaling method, format and definition of the messages and parameters of the DN are defined in Bellcore Technical References TR-TSY-000030 and TR-TSY-000031. The standards requirement of a channel seizure tone is of course not required since the first party apparatus is ready to receive. The FSK data corresponding to the third party DN is received by FSK demodulator 22 of the apparatus which translates it to a digital bit stream that is fed to microprocessor 20 of the apparatus which, in turn, translates the data into the DN of the third party displayed on display 23 of the apparatus.

It can be seen that digit receiver 107 of the TCO 100 is connected to station 102 of the first party via one of the junctors 106. When a predetermined digit is entered on the first party apparatus at station 102 and the digit is a permitted digit, central control 109 of the TCO reads the digit received by digit receiver 107 via scanner 113 and stores it in the temporary call register memory (not shown) of call store 110 of the TCO. Under the control of a digit analysis program and through the use of translation tables in call store 110, central control 109 executes a program in program store 111 of the TCO which causes the third party at station 103 to be connected to the first and second parties already engaged in an existing conversation for three-way conversations between the first, second and third parties, or causes the second party at station 170 who is presently on hold due to the first party answering the third party call to be connected to the first and third parties for three-way conversations between the first, second and third parties.

The embodiments illustrated and discussed herein are intended only to teach those skilled in the art the best way known by the inventor to make and use the invention. Nothing in the specification should be considered as limiting the scope of the present invention, but rather as an exemplification of one preferred embodiment thereof. Many other variations are possible. Any changes could be made by those skilled in the art to produce equivalent methods and systems without departing from the invention. The scope of the invention should be determined not by the embodiment(s) illustrated, but by the appended claims and their legal equivalents.

What is claimed is:

1. A method of providing to a first party already engaged in a telephone conversation with a second party via a terminating central office a directory telephone number with a corresponding name (DN) of a calling third party wishing to converse with said first party and then, in response to a predetermined digit entered on a keypad of said first party apparatus while said first party is engaged in said telephone conversation with said second party, connecting said calling third party to said first and second parties for three way conversations between said first, second and third parties, comprising the steps of:

(a) said terminating central office, in response to receiving said calling third party DN flagged as public from an originating central office of said calling third party indicating that said DN is to be disclosed to said first party, sending a call waiting tone signal to said first party;

(b) said first party apparatus, in response to said call waiting tone signal, muting its associated handset for a predetermined interval of time;

(c) said first party apparatus also generating and transmitting an acknowledgment tone to said terminating central office;

(d) said terminating central office, in response to said acknowledgment tone, transmitting said DN of said calling third party to said first party apparatus during a silent interval of said call waiting tone signal cycle;

(e) said first party apparatus receiving and displaying said DN of said calling third party from said terminating central office during said silent interval of said call waiting tone signal cycle while said first party is engaged in said telephone conversation with said second party;

(f) said terminating central office determining whether a hookswitch flash has been detected on said first party loop due to said first party answering said calling third party call based on said calling third party identity;

(g) said terminating central office determining whether a predetermined digit has been received from said first party apparatus while said first party is engaged in said telephone conversation with said second party if the hookswitch flash has not been detected on said first party loop; and (h) said terminating central office connecting said calling third party to said first and second parties for said three way conversations between said first, second and third parties if the predetermined digit has been received from said first party apparatus while said first party is engaged in said telephone conversation with said second party and that said received digit is a permitted digit.

2. A telephone switching system, comprising:

(a) means for sending a call waiting tone signal to a first party already engaged in a telephone conversation with a second party to indicate an incoming third party call from a third party, in response to receiving said third party directory telephone number with a corresponding name (DN) flagged as public from an originating central office of said third party indicating that said DN is to be disclosed to said first party;

(b) means for transmitting said DN of said third party to said first party apparatus during a silent interval of said call waiting tone signal cycle while said first party is engaged in said telephone conversation with said second party, after said first party apparatus has muted its associated handset for a predetermined duration of time and transmitted an acknowledgment tone to said switching system in response to said call waiting tone signal, said first party apparatus receiving and displaying said transmitted DN of said third party during said silent interval of said call waiting tone signal cycle while said first party is engaged in said telephone conversation with said second party;

(c) means for determining whether a hookswitch flash has been detected on said first party loop due to said first party answering said third party call;

(d) means for determining whether a predetermined digit has been received from said first party apparatus while said first party is engaged in said telephone conversation with said second party if the hookswitch flash has not been detected on said first party loop; and (e) means for connecting said third party to said first and second parties for a three way conference between said first, second and third parties if the predetermined digit has been received from said first party apparatus while said first party is engaged in said telephone conversation with said second party and that said received digit is a permitted digit.

* * * * *